Sept. 10, 1968    G. RAYNOVICH, JR    3,400,627
BLIND FASTENERS WITH SPLIT DEFORMABLE SLEEVE
Filed Jan. 3, 1967

Inventor
George Raynovich, Jr.

United States Patent Office 3,400,627
Patented Sept. 10, 1968

3,400,627
BLIND FASTENERS WITH SPLIT
DEFORMABLE SLEEVE
George Raynovich, Jr., Pittsburgh, Pa., assignor to
Edward M. Citron, Pittsburgh, Pa.
Continuation-in-part of application Ser. No. 362,580,
Apr. 27, 1964. This application Jan. 3, 1967, Ser.
No. 606,941
6 Claims. (Cl. 85—70)

ABSTRACT OF THE DISCLOSURE

A blind fastener having a shank threaded at one end and stop means, preferably in the form of a groove, intermediate the ends of the shank, a pair of deformable half sleeves to be positioned around the threaded member, each half sleeve having a stop engaging means at one end and a threaded portion at the other end to engage the stop and threads respectively of the shank so that on rotation of the shank the threaded portion moves toward the stop engaging means to deform the half sleeve outwardly.

---

This application is a continuation-in-part of application, Ser. No. 362,580, filed Apr. 27, 1964, now Patent No. 3,304,829.

This invention relates to blind fasteners and particularly to a blind fastener which may be used on bolts to attach the same to the interior of a hole particularly in material incapable of being threaded.

The use of blind fasteners or expansion bolts for attaching objects to masonry walls and the like is not new. Nuts provided with spring loaded wings, with driven deformable metal portions and various deforming devices are known. Generally, however, these devices require excessively large holes as in the case of spring loaded wings or special tools as in case of driven deformable metal portions on the nuts or for some other reason do not entirely satisfactorily act to attach objects to unthreaded holes.

I have invented a blind fastener or expansion bolt which requires a small hole and which completely fills and seals the hole when applied therein. My device is simple to install and requires no special tools.

In a preferred embodiment of my invention, I provide an elongated member having a threaded end portion, a pair of half washers, and a pair of threaded half nuts, one of each pair attached to opposite ends of and spaced apart by a resilient member, said half nuts being adapted to threadingly engage said threaded member and said washers being adapted to engage a stop means formed on said threaded member. Preferably, the nuts and the washers are circular in peripheral contour and are embedded at the ends of and surrounded by a resilient spacing means in the form of a half cylinder. The half nuts and half washers may also be simply bonded to opposite ends of an elongated rubber half cylinder.

Figure 1:
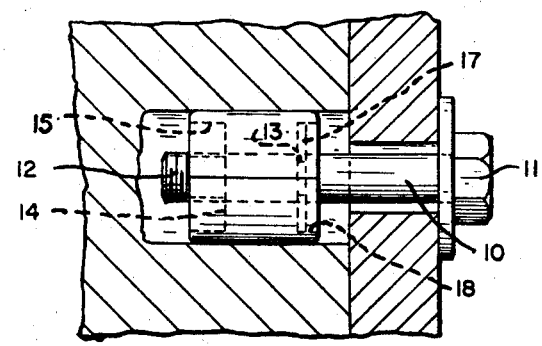
Figure 2:
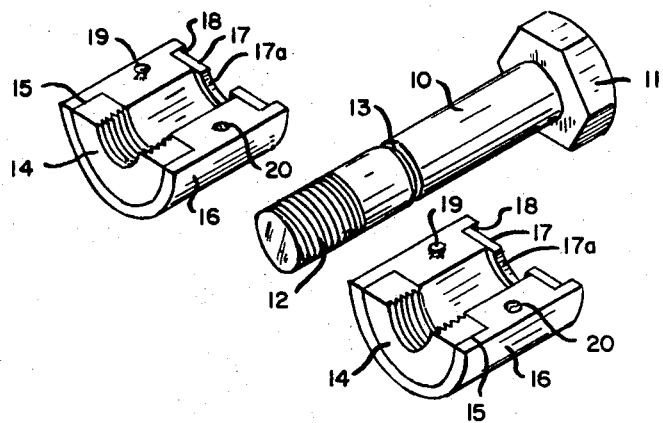

In the foregoing general description, I have set out certain objects, purposes and advantages of my invention. Other objects, purposes and advantages of this invention will be apparent from a consideration of the following description and the accompanying drawings in which:

FIGURE 1 is a side elevational view of a blind fastener according to my invention installed in a hole; and FIGURE 2 is an isometric exploded view of the fastener of FIGURE 1.

Referring to the drawings, I have illustrated a bolt 10 having a head 11 at the one end and threads 12 at the opposite end. An annular slot or groove 13 is formed in the bolt intermediate the head 11 and the threads 12. An expansible nut structure made up of threaded half nuts 14 inserted and bonded in a recess 15, half cylinders or sleeves of rubber 16 and half washers 17 inserted and bonded in a recess 18 in the other end of the sleeve 16 may be of rubber or any other expansible material. The device is used by placing the half nut assemblies over the bolt 10 with the central opening 17a of the half washers 17 fitting within the annular groove 13 of the bolt and the half nut portions 14 engaging the threaded portion 12 of the bolt. The sleeves are fastened together by snap fasteners 19–20, a snap on one half and a snap receiving recess on the other half. The half nut assembly is placed on the bolt as described and is inserted into a prepared opening and the head 11 of the nut 10 rotated to draw the half nuts 14 toward the half washers 17 to deform and expand the intermediate sleeves 16 into engagement with the walls of the hole in which it is inserted.

In the foregoing specification, I have set out a certain preferred embodiment of my invention. It will be understood, however, that this invention may be otherwise embodied within the scope of the following claims.

I claim:
1. A blind fastener comprising a member having a shank threaded at one end and stop means adjacent the threaded end, a pair of deformable half sleeves constructed and arranged to be positioned around said threaded member, nut halves fixed to one end of each of said half sleeves, washer halves fixed to the other end of each of said half sleeves, said nut halves threadingly engaging with said threaded end when said half sleeves are positioned around said threaded member, said washer halves rotatably engaging said stop means whereby said washer halves are held against axial movement, said nut halves moving axially toward said washer halves when said threaded member is rotated relative to said half sleeves to thereby distort said half sleeves.

2. The blind fastener of claim 1 wherein said nut halves are a pair of right hand threaded half nuts.

3. A blind fastener as claimed in claim 2 wherein the stop means is an annular groove receiving the washer halves.

4. A blind fastener as claimed in claim 1 wherein the paired nut halves are held together by the overlying portions of the half sleeves cooperating with the hole into which the assembly is placed.

5. A blind fastener as claimed in claim 1 wherein the means are provided acting on the paired half nuts to hold them together.

6. A blind fastener as claimed in claim 5 wherein the means acting on the paired nut halves to hold them together are snap fasteners on the adjacent edges of the half sleeves.

References Cited

UNITED STATES PATENTS

| | | | |
|---|---|---|---|
| 2,542,967 | 2/1951 | Waechter | 85—67 |
| 2,625,071 | 1/1953 | Lewis | 85—67 |
| 2,773,554 | 12/1956 | Lindorf | 85—70 |
| 3,144,738 | 8/1964 | Block | 85—70 |

FOREIGN PATENTS 519,317    5/1953    Belgium.

MARION PARSONS, Jr., *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,627            September 10, 1968

George Raynovich, Jr.

It is certified that error appears in the above identified patent and that said Letters Patent are hereby corrected as shown below:

Column 2, line 8, "sleeve 16" should read -- sleeves 16. The sleeve 16 --.

Signed and sealed this 27th day of January 1970.

(SEAL)
Attest:

Edward M. Fletcher, Jr.

Attesting Officer

WILLIAM E. SCHUYLER, JR.

Commissioner of Patents